US005517544A

United States Patent [19]
Levinson

[11] Patent Number: 5,517,544
[45] Date of Patent: May 14, 1996

[54] AFTERGLOW ARTIFACT REDUCTION

[75] Inventor: Reuven Levinson, Haifa, Israel

[73] Assignee: Elscint Ltd., Haifa, Israel

[21] Appl. No.: 206,281

[22] Filed: Mar. 7, 1994

Related U.S. Application Data

[63] Continuation of Ser. No. 658,249, Feb. 20, 1991, abandoned.

[51] Int. Cl.⁶ ..................................... G06F 15/00
[52] U.S. Cl. .................. 378/4; 378/19; 378/901
[58] Field of Search ............... 364/413.14, 413.15, 364/413.2, 413.21, 724.01, 724.12, 728.01, 819, 825; 250/369, 363.07; 378/4, 19, 901

[56] References Cited

U.S. PATENT DOCUMENTS

| | | | |
|---|---|---|---|
| 4,044,261 | 8/1977 | Wilson | 250/369 |
| 4,489,236 | 12/1984 | Outwaite | 250/369 |
| 4,554,633 | 11/1985 | Glover et al. | |
| 4,612,443 | 9/1986 | Alcidi | 250/369 |
| 4,761,738 | 8/1988 | Lobregt et al. | 378/901 |
| 4,899,393 | 2/1990 | Morishita et al. | |
| 5,014,133 | 5/1991 | Mumford | |
| 5,128,864 | 7/1992 | Waggener et al. | 364/413.21 |
| 5,265,013 | 11/1993 | King et al. | 364/413.21 |

FOREIGN PATENT DOCUMENTS 54122185  9/1979  Japan ..................... 250/369

Primary Examiner—Robert A. Weinhardt
Assistant Examiner—Jennifer H. Dixon
Attorney, Agent, or Firm—Greenblum & Bernstein

[57] ABSTRACT

A system for reducing afterglow induced artifacts by filtering out afterglow using recursive filters that are tailored to match the intensity and decay time of the scintillating detectors that produce the afterglow.

6 Claims, 2 Drawing Sheets

AFTERGLOW ARTIFACT REDUCTION

This application is a continuation of application Ser. No. 07/658,249, filed Feb. 20, 1991, now abandoned.

FIELD OF THE INVENTION

This invention is concerned with computerized tomographic (CT) images and more particularly with afterglow artifacts that occur in such images. This invention removes or reduces such artifacts.

BACKGROUND OF THE INVENTION

To aid in measuring the radiation passing through a patient, detector channels of CT equipment detect the X-rays and convert them to electrical signals. One type of such transducers uses scintillating material. Scintillating material is material that emits light photons responsive to impingement thereon by X-rays. An example of scintillating material is cadmium tungstate (CDWO4) crystals. However, this invention is not limited to scintillating crystals, but will operate just as well with other transducers that suffer from afterglow problems.

The scintillating crystals serve as transducers of X-ray radiation to transform the X-ray radiation into optical radiation. When X-ray photons are absorbed by a scintillator, photo-electrons are ejected from the atoms of the scintillator. This photo-electron loses its energy through multiple interactions with other electrons. The secondary electrons release part of their energy in the form of optical radiation and the crystal "scintillates".

The crystal contains what are known as electron traps. When an electron is trapped, its scintillation will be delayed and an afterglow will occur. Aftergow is the existence of scintillation after the cessation of the X-ray radiation. The origin of the afterglow is not clear, it may be caused by such things as chemical impurities or crystal structure imperfections. It is known that a crystal afterglow scintillation decays exponentially when irradiated by a step function. The afterglow, therfore, seems to have a "memory" effect and acts as a low-pass filter.

In the past, to overcome the afterglow, materials which supposedly do not provide afterglow have been used. However, it has been found that most of the other materials that generate less afterglow than cadmium tungsten crystals, also provide an initial "glow" having a lower intensity or amplitude than that of the crystal scintillators which do suffer from afterglow.

Another attempt at overcoming the afterglow problem used presently is the preselection of the detectors in an effort to use only detectors that have no afterglow. This method, of course, is extremely expensive since a relatively large proportion of the detectors have to be discarded because of afterglow problems.

Thus the prior art methods of overcoming or compensating for the afterglow artifacts has been to use materials providing lower intensities and/or selecting detectors that have less afterglow than the average detector. The prior art correction methods are either expensive in money and time and/or expensive in the intensity of the final signals.

Accordingly, those skilled in the art are continuously searching for methods and means for overcoming the afterglow caused artifacts.

BRIEF DESCRIPTION OF THE INVENTION

In accordance with a broad aspect of the present invention, a method for reducing afterglow artifacts in CT images is provided, said method comprising the step of: filtering out the after glow signals.

A feature of the present invention comprises utilizing recursive filters as the filtering means for filtering out the afterglow signals.

Yet another feature of the present invention comprises determining the intensity of the afterglow scintillation relative to the intensity of the original scintillation and decay time constant of the afterglow scintillation of the detectors. Then, tailoring the filtering to match the intensity and the decay time of the scintillation detectors. Thus the filters are tailored in accordance with a step of calibrating the detectors to determine the intensity of the afterglow scintillation relative to the intensity of the original scintillation and the decay time constant of the afterglow scintillation provided by the system detectors.

BRIEF DESCRIPTION OF THE DRAWINGS

The above named and other features and objects of the present invention will be best understood when considered in the light of the following description of a broad aspect of the invention made in conjunction with the accompanying drawings; wherein.

GENERAL DESCRIPTION

Figure 1:
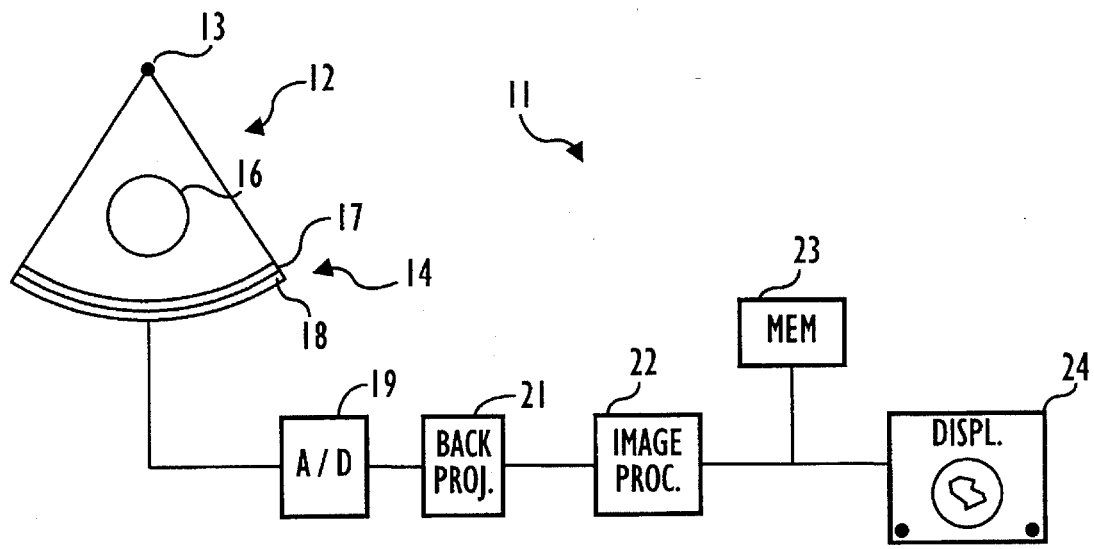
FIG. 1 is a prior art CT system that provides images plagued by afterglow artifacts.

The computerized tomographic system 11 of FIG. 1 includes a front end 12. The front end 12 comprises a source of X-rays 13 mounted on a gantry along with detectors 14. The X-rays from the source 13 pass through a patient or object 16 and are detected by the detectors 14. In the preferred embodiment the detectors 14 include scintillator crystals such as cadmium tungstate crystals for converting the X-ray radiation into light photons which are then converted into electronic signals. The detectors 14 includes a scintillator 17 and a transducer 18 for converting the light photons into electrons and thus to electrical signals. The number of electrons from the detectors 14 are a function of the X-ray attenuation of the portions of the subject 16 through which the X-ray radiation passes.

The electrical signals are received from the front end 12 in analog form and are converted into digital form by analog to digital converter 19. The digital signals are used by back projector 21 and image processor 22 in conjunction with memory 23 to provide the well known tomographic images generated by CT scanners in display means 24.

As noted previously, these display images are plagued by afterglow artifacts. The afterglow artifacts typically appear as a series of radiating streaks in the image which often obscure lesions or other manifestations of the condition of the patient which are the object of the X-ray examination.

Figure 2:
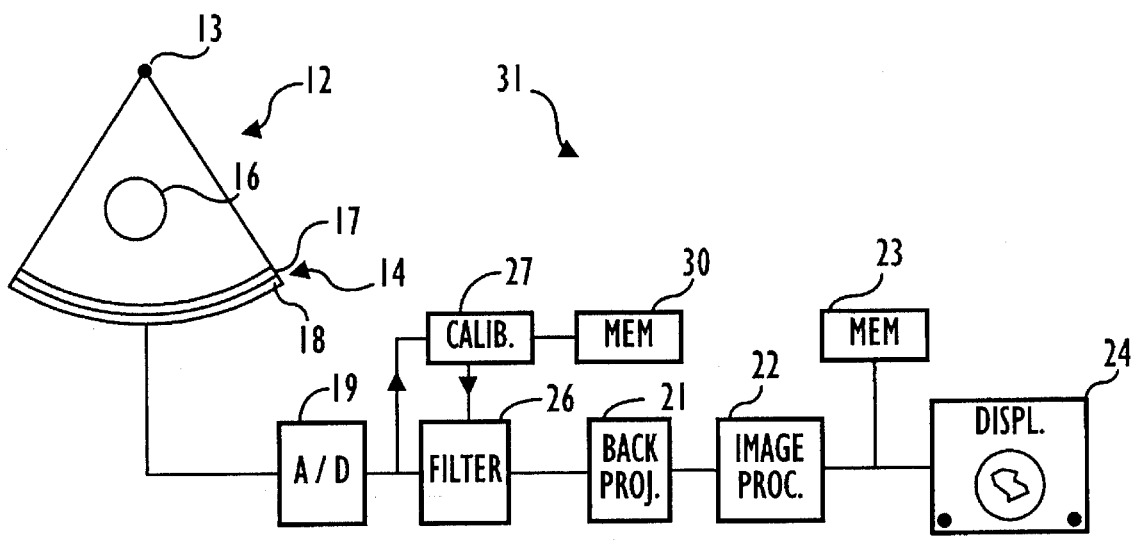
FIG. 2 is a block diagram showing of the inventive CT system having a filter therein for removing the afterglow that generates the artifacts.

As shown in FIG. 2, to overcome the artifacts caused by the afterglow, a filter 26 is provided. The filter 26 is a recursive type filter and receives parameters such as afterglow amplitude and decay characteristics generated during a calibration procedure from a calibrator 27. The other portions of FIG. 2 which are the same as those of FIG. 1 bear the reference numerals used in FIG. 1. Thus, the improved system with the filter is denoted as system 31. It includes a front end similar to that of the system 11 of FIG. 1.

The system 31 of FIG. 2 is shown as having an X-ray source 13 on a gantry 12 which generates X-rays that pass through a subject 16 and are detected by detectors 14 on the gantry. The detectors 14 here again are shown as including a scintillating unit 17 and means for converting the light photons to electrical signals at 18. The analog to digital converter 19 provides digital signals to the filter 26. The calibrator unit 27 provides characteristics of the filter based on parameters of the scintillating detectors and the front end electronics which convert the light photons to electrical signals.

The back projector 21 in FIG. 2 uses the signals from the filter 26 rather than directly from the analog to digital converter 19. The image processor, memory and display units operate in the same way in the system of FIG. 2 as they did in the system of FIG. 1. It should be understood that a software type recursive filter may be used where a hardware filter is indicated.

Figure 3:
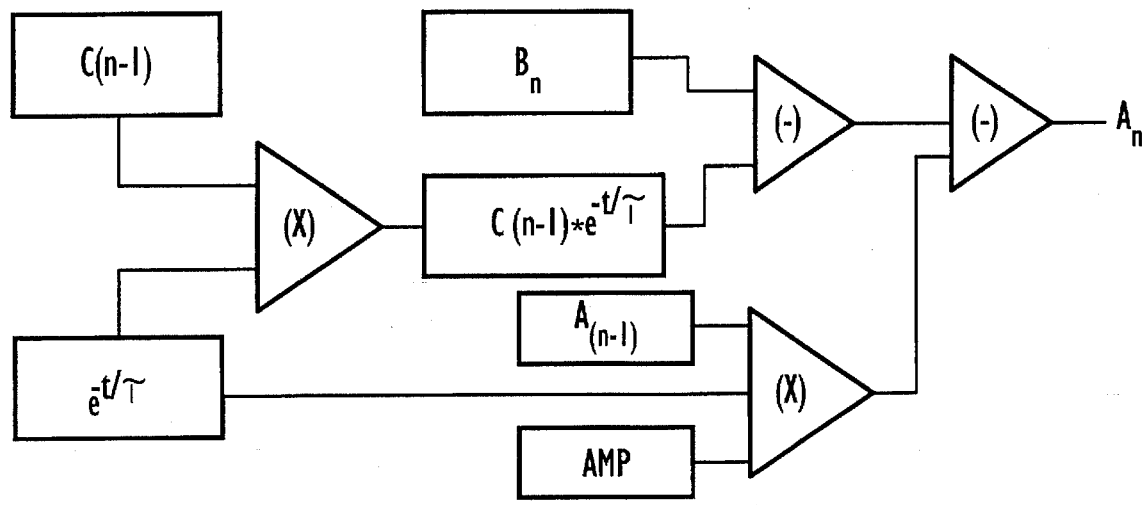
FIG. 3 is a block diagram of a preferred recursive filter for use as the filter of FIG. 2.

The details of the preferred embodiment recursive filter are shown in FIG. 3. The equipment of FIG. 3 solves an equation that states that:

$$A_n = B_n - C_{(n-1)} e^{-t/\tau} - A_{(n-1)} * (AMP) e^{-t/\tau}$$

where

A are the corrected values,

B are the measured values, n is the number of the measurement taken. The last part measurement is always used in this sequence except for during the first measurement, C are the last corrected values prior to the present corrected values $A_{(n-1)}$, AMP is the intensity of the afterglow scintillation relative to the intensity of the original scintillation which includes all contributions to the afterglow of previous impingements of X-rays on the scintillating material t is the time from the previous measurement to the present measurement, and $\tau$ is the decay time constant of the afterglow scintillation.

The calibration is accomplished by directing a unit width step function of X-rays from the source 13 to the detectors 14 and measuring the output.

Figure 4:
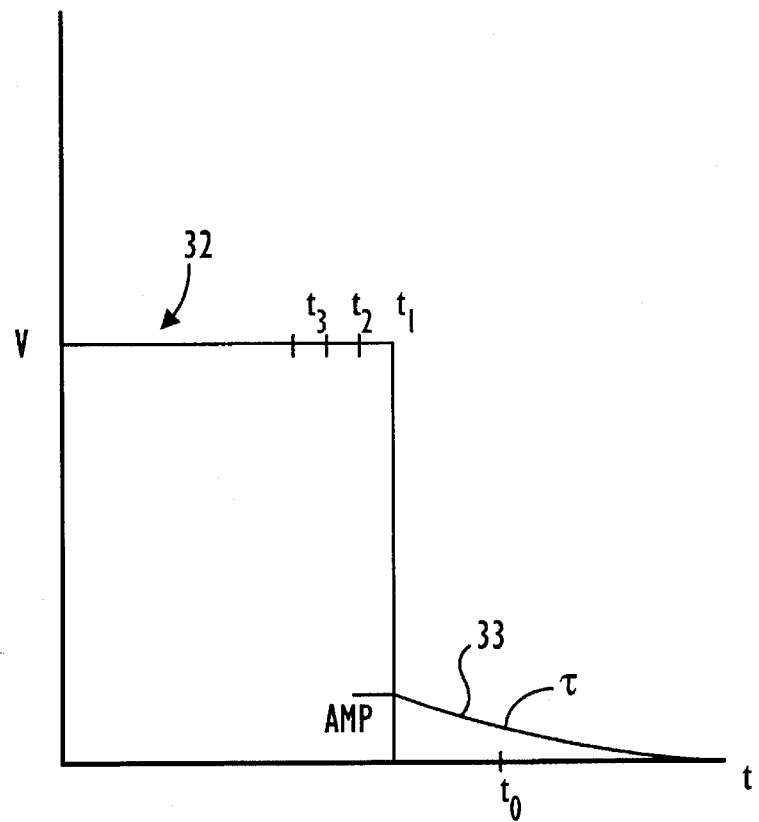
FIG. 4 is a showing of the output of the X-ray detectors with a square wave or unit width step function input.

The output will be as shown in FIG. 4; i.e., a square wave having a massive glow tail. The square wave is shown at 32 having a total amplitude V and having a tail 33 which has a maximum amplitude of AMP and has a decay time $\tau$. The $\tau$ of the equation includes all of the previous contributions. It has been found that it is necessary to remove all of the previous contributions to the after glow, hence: the corrective signals is:

$$A(to) = B(to) - \int_{to}^{t\infty} B(t) e^{-t/\tau} dt$$

Thus the quantity C(n–1) amounts to the integral of the measured signal.

In FIG. 3 a stylized block diagram of the recursive filter 26, shows that the decay indicated by $e^{-t/\tau}$ is multiplied by: C(n–1). In the same manner, the product $C(n-1)e^{-t/\tau}$ is subtracted from the measured value Bn to provide the difference $Bn - C(n-1)e^{-t/\tau}$. The immediate previously corrected value A(n–1) is multiplied by AMP, the amplitude of the afterglow tail obtained during the calibration procedure and stored in the memory 30 shown in FIG. 2. Subsequently it is further multiplied by the decay function $e^{-t/\tau}$. The product of the triple multiplicands is subtracted from the last obtained difference to provide a final difference. This final difference is the present corrected signal, i.e. A(n) which is the signal corrected to remove the afterglow.

Using the filter of FIG. 3 enables utilizing scintillators such as cadmium tungstate scintillators with relatively high outputs. Subjecting the detector scintillators to a selecting process becomes unnecessary.

The invention enables scintillators or other types of transducers using "non-scintillating" detectors to be used that have not undergone a rigid selection processing. Even more important scintillators or other transducers can be used which have a high output by subjecting the detected signal to a filtering process to remove the afterglow.

The invention has been described with reference to certain preferred embodiments and it should be understood that this description is made by way of an example only and not as a limitation on the scope of the invention.

What is claimed is:

1. A method of reducing afterglow scintillation-caused artifacts in computerized tomographic X-ray images, the said method comprising the steps of:

a) directing X-rays from an X-ray source towards a subject from a plurality of positions around the subject;

b) using detectors, including scintillators, for converting the X-rays received from the source and traversing the subject during a plurality of measurements ranging from a first measurement to a last measurement n, to light photons both from direct scintillation and from afterglow;

c) converting the light photons to measured electrical signals having measured values that are functions of both the direct scintillation and the afterglow;

d) operating on the measured electrical signals using a backprojector to provide a tomographic image of the subject;

e) wherein said operating step also includes filtering out electrical signals caused by said afterglow occurring in the scintillators using a recursive filter to obtain corrected electrical signals having corrected values, f) said step of filtering out said afterglow further comprises the steps of:

g) determining afterglow intensity characteristics by applying a unit step function to the X-ray source to obtain a square wave intensity output from the detectors, said square wave output having an afterglow tail that has an original relative intensity amplitude AMP at the termination of the square wave and a decay time constant $\tau$;

h) determining values for the original relative intensity amplitude AMP and the decay time constant $\tau$ of the afterglow tail; and i) using the determined values as parameters to adjust the filter for removal of the electrical signals caused by the afterglow intensity to obtain the corrected electrical signals having the corrected values.

2. The method of claim 1 wherein said filtering step solves an equation that states that:

$$A_n = B_n - C_{(n-1)} \cdot e^{-t/\tau} - A_{(n-1)} \cdot (AMP) e^{-t/\tau}$$

having an initial condition
$$A(0) = 0$$
$$C(0) = 0$$
$$C(1) = 0$$

where:

A(n) is a corrected value of nth measurement,

B(n) is a measured value of nth measurement, n is a number of the last measurement taken, where n is greater than 1, C is a corrected value immediately prior to a present corrected value, AMP is afterglow scintillation intensity relative to original scintillation intensity which includes all contributions of previous impingements, t is time elapsed from an immediate previous measurement to a present measurement, and $\tau$ is a decay time constant of the afterglow scintillation which includes all of the previous contributions.

3. The method of claim 2 wherein the filtering step solves the equation:

$$A_{(to)} = B_{(to)} - \int_{to}^{t\infty} B_{(t)} e^{-t/\tau} dt$$

where:

A is the corrected value,

B is the measured values from t=0 to t=infinity, t0 is the time when t equals 0, and $\tau$ is the decay constant.

4. A system for reducing afterglow scintillation-caused artifacts in computerized tomographic x-ray images, the said system comprising:

(a) a gantry for directing x-rays from an x-ray source towards a subject from a plurality of positions around the subject;

(b) detectors including scintillators on said gantry for converting the x-rays received from the source and traversing the subject to light photons both from direct scintillation and from afterglow during a plurality of measurements ranging from a first measurement to a last measurement n, (c) a transducer for converting the light photons to measured electrical signals having measured values that are functions of both the light photons from the direct scintillations and the afterglow;

(d) a backprojector for operating on the measured electrical signals to provide a tomographic image of the subject;

(e) a recursive filter located prior to said backprojector for filtering said measured electrical signals to remove electrical signals caused by said afterglow occurring in said scintillators to obtain corrected electrical signals having corrected values; said recursive filter comprising:

(f) a calibrator for determining afterglow characteristics by applying a unit step function to the x-ray source whereby the detectors provide a source wave intensity output having a large afterglow tail that has an intensity amplitude AMP at the termination of the square wave and a decay time constant, (g) said calibrator further determining the original relative afterglow intensity amplitude (AMP) and the decay time constant $\tau$ of the afterglow tail; and (h) a computer for using the determined afterglow intensity value (AMP) and the determined decay time for obtaining component values for said filter that assures that the filter removes the electrical signals caused by the afterglow tail and provides corrected electrical signals having corrected values.

5. The system of claim 4 wherein said recursive filter solves the equation:

$$A_n = B_n - C_{(n-1)} \cdot e^{-t/\tau} - A_{(n-1)} \cdot (AMP) e^{-t/\tau}$$

having an initial condition
$$A(0) = 0$$
$$C(0) = 0$$
$$C(1) = 0$$

where:

A(n) is a corrected value of nth measurement,

B(n) is a measured value of nth measurement, n is the number of a last measurement taken, C is a last corrected value prior to a present corrected value, AMP is afterglow scintillation intensity relative to original scintillation intensity which includes all contributions to afterglow of previous impingements of x-rays on the scintillator, t is the time elapsed from an immediately prior last measurement to a present measurement, where a first measurement is made before afterglow, and $\tau$ is a decay time constant of the afterglow scintillation which includes all of the of the previous contributions.

6. The system of claim 5 wherein the filtering step solves the equation:

$$A_{(to)} = B_{(to)} - \int_{to}^{t\infty} B_{(t)} e^{-t/\tau} dt$$

where:

A is the corrected value,

B is the measured values from t=0 to t=infinity, t0 is the time when t equals 0, and $\tau$ is the decay constant.

* * * * *